(12) United States Patent
Wilson et al.

(10) Patent No.: US 10,266,158 B2
(45) Date of Patent: Apr. 23, 2019

(54) JACK PADS FOR SUPPORTING VEHICLE JACK FEET

(71) Applicant: ORIGEN RV ACCESSORIES LTD., Calgary (CA)

(72) Inventors: Gordon Wilson, Calgary (CA); Devon Wilson, Calgary (CA); Warren Blatz, Calgary (CA)

(73) Assignee: ORIGEN RV ACCESSORIES LTD., Calgary (CA)

( * ) Notice: Subject to any disclaimer, the term of this patent is extended or adjusted under 35 U.S.C. 154(b) by 14 days.

(21) Appl. No.: 15/148,740

(22) Filed: May 6, 2016

(65) Prior Publication Data

US 2016/0325974 A1 Nov. 10, 2016

Related U.S. Application Data

(60) Provisional application No. 62/158,825, filed on May 8, 2015.

(51) Int. Cl.
*B60S 9/02* (2006.01)
*B60S 9/04* (2006.01)

(52) U.S. Cl.
CPC ............ *B60S 9/04* (2013.01); *F16M 2200/08* (2013.01)

(58) Field of Classification Search
CPC . B60S 9/02; B60S 9/04; A47B 91/005; F16M 2200/08; F16M 11/20; E04H 12/22; E04H 12/2269; A47G 23/0316
USPC .. 248/346.04, 346.01, 188.1, 678, 519, 521, 248/346.03, 346.06, 346.11, 346.5
See application file for complete search history.

(56) References Cited

U.S. PATENT DOCUMENTS

| | | | |
|---|---|---|---|
| 1,767,134 A * | 6/1930 | Huye | A47F 7/06 211/33 |
| 2,221,203 A | 11/1940 | Sandberg | |
| D133,106 S | 7/1942 | Phillips | |
| 2,929,601 A * | 3/1960 | Anderson | A47G 23/02 248/346.04 |
| 3,808,084 A * | 4/1974 | Doty | A47G 23/03 248/346.11 |
| 4,073,454 A | 2/1978 | Sauber | |
| 4,254,927 A | 3/1981 | Stonhaus | |
| D282,241 S | 1/1986 | Sauber | |
| 4,577,828 A * | 3/1986 | Drucker | F24F 13/32 248/310 |
| 4,634,144 A | 1/1987 | Ringe | |
| D304,575 S | 11/1989 | Batzel | |
| 5,046,587 A | 9/1991 | Jones | |
| 5,383,639 A * | 1/1995 | Byard | B62B 3/1404 156/71 |
| 5,419,524 A | 5/1995 | Evans et al. | |

(Continued)

FOREIGN PATENT DOCUMENTS

| CN | 202243230 | 5/2012 |
|---|---|---|
| GB | 1387347 | 3/1975 |

(Continued)

*Primary Examiner* — Anita M King
(74) *Attorney, Agent, or Firm* — Bennett Jones LLP

(57) ABSTRACT

An improved jack pad for supporting a jack foot having a foot plate includes a body having an upper surface and a lower surface joined by a side wall, and defining a recess configured for receiving the foot plate and having a retaining lip for securing the foot plate therein. The jack pad may provide for the drainage of water from the pad.

42 Claims, 14 Drawing Sheets

(56) References Cited

U.S. PATENT DOCUMENTS

| | | | |
|---|---|---|---|
| 5,645,103 A * | 7/1997 | Whittaker | F24H 9/06 137/312 |
| 5,685,509 A * | 11/1997 | Harrison | F24H 9/06 248/146 |
| 5,738,325 A * | 4/1998 | Brown | G06F 3/0395 248/205.3 |
| 6,116,266 A * | 9/2000 | Dickison | F16N 31/006 137/312 |
| D531,378 S | 10/2006 | Angel et al. | |
| 7,300,032 B2 | 11/2007 | Williams et al. | |
| D577,648 S | 9/2008 | Shaw | |
| 7,958,967 B2 * | 6/2011 | Lambdin | E04G 5/02 182/179.1 |
| D668,423 S | 10/2012 | Brockington et al. | |
| 8,814,121 B2 | 8/2014 | Koberg | |
| 9,004,309 B1 * | 4/2015 | Gardner | B01F 15/00733 220/495.01 |
| 2005/0017223 A1 | 1/2005 | Lucas | |
| 2009/0072525 A1 | 3/2009 | Banks | |
| 2015/0028177 A1 * | 1/2015 | Vargas | B60S 9/02 248/542 |

FOREIGN PATENT DOCUMENTS

| | | | |
|---|---|---|---|
| GB | 2459533 A | 11/2009 | |
| GB | 2501698 A | 11/2013 | |
| WO | 03064239 A1 | 8/2003 | |

* cited by examiner

PRIOR ART

JACK PADS FOR SUPPORTING VEHICLE JACK FEET

FIELD OF THE INVENTION

The present invention relates generally to improved jack pads for supporting vehicle jack feet. The present invention further relates to methods for the manufacture of the jack pads as well as methods for usage.

BACKGROUND OF THE INVENTION

Typical recreational vehicles, fifth wheels, motor homes and travel trailers are equipped with electric or hydraulic jacks which are lowered to the ground to lift the vehicle in order to provide a stable, comfortable, level living environment. Such levelling systems are commonly operated by the user using a control panel inside the vehicle. Prior to initiating levelling, the user must estimate or guess the approximate positions on the ground on which to place the jack pads to support the jack feet when eventually lowered.

However, the ground at camp sites may vary from gravel pads, concrete or asphalt pads, and soft surfaces such as grass or sand. The metal jack feet are capable of damaging such surfaces due to the weight of the vehicle applied to the ground when the vehicle is being leveled. Sinking of jack feet into the surface on which leveling is attempted not only damages the surface, but also poses a safety hazard to the user. In addition, it is necessary that the vehicle be leveled in order that equipment such as refrigerators and gas stoves inside the vehicle operates more efficiently and safely.

Accordingly, there is a need in the art for an improved jack pad which mitigates these problems.

SUMMARY OF THE INVENTION

The present invention relates to improved jack pads for use in supporting vehicle jack feet.

In one aspect, the invention comprises an improved jack pad for supporting a jack foot including a foot plate, the pad comprising: a body having an upper surface and a lower surface joined by a side wall, and defining a recess configured for receiving the foot plate and having a retaining lip for securing the foot plate therein.

In one embodiment, the side wall is arranged in an octagonal configuration. In one embodiment, the pad further comprises an aperture extending through the body to receive and accommodate attachment means of the foot plate therethrough.

In one aspect, the invention comprises the above improved jack pad further comprising a bevelled portion comprising an annular inclined portion extending circumferentially around the recess. In one embodiment, the bevelled portion forms an angle ranging from about 30 degrees to about 65 degrees. In one embodiment, the bevelled portion forms an angle of about 45 degrees.

In one aspect, the invention comprises the above improved jack pad further comprising at least one adhesive layer coated onto the pad, the foot plate, or both. In one embodiment, the pad further comprises at least one barrier layer between adjacent adhesive layers.

In one embodiment, the above pads are formed of a flexible, elastic material. In one embodiment, the material comprises crumb rubber. In one embodiment, the material comprises resin. In one embodiment, the material comprises resin and crumb rubber.

In an embodiment, the pads can further comprise drainage means for allowing the drainage of water from the pad, the drainage means comprising one or more channels located at the upper surface of the pad, one or more substantially circular channels located at the recess of the pad interconnecting with one or more substantially straight channels located at the recess of the pad, one or more apertures located at the lower surface of the pad, or combinations thereof.

In a further embodiment, the invention comprises an improved jack pad for supporting a jack foot including a foot plate, the pad being formed of a flexible, elastic material and comprising a body having an upper surface and a lower surface, a side wall arranged in an octagonal configuration joining the upper surface and the lower surface, a recess configured for receiving the foot plate, the recess positioned at substantially the center of the pad, wherein the recess has a diameter which is substantially the same as the diameter of the foot plate, an aperture positioned at substantially the center of the recess, the aperture extending through the body to receive and accommodate attachment means of the foot plate therethrough, and a retaining lip for securing the foot plate therein, the lip configured for gripping a peripheral edge of the foot plate within a groove formed under the lip upon insertion.

In another aspect, the invention comprises a method for using an improved jack pad for providing support to a vehicle on a support surface.

In another aspect, the invention comprises the manufacture of an improved jack pad, wherein the pad is cast or molded as a single piece.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF PREFERRED EMBODIMENTS

Figure 1:
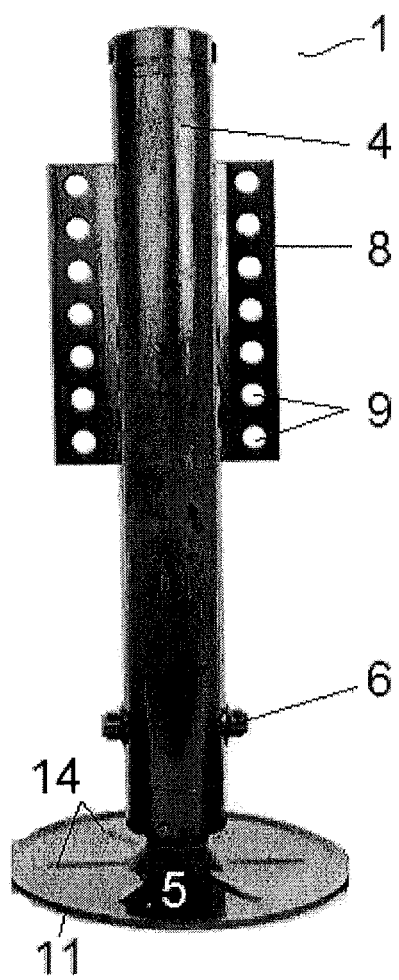
FIG. 1 is a perspective view of a conventional jack foot.
Figure 2:
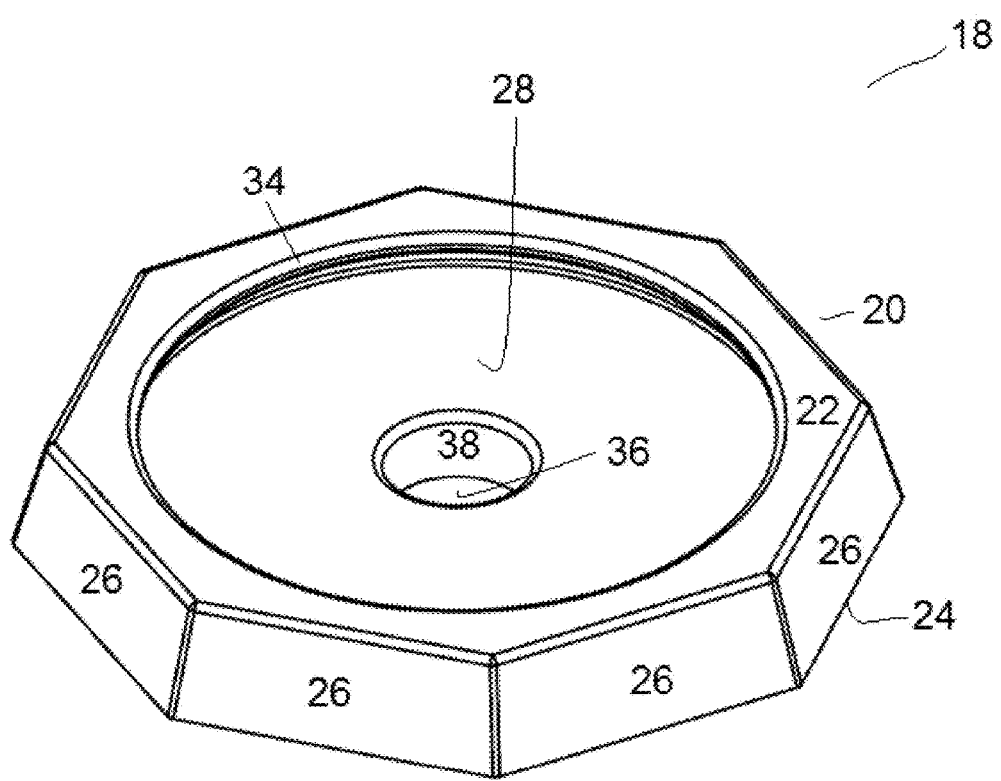
FIG. 2 is a perspective view of one embodiment of the pad of the present invention.

Before the present invention is described in further detail, it is to be understood that the invention is not limited to the particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

The present invention relates to improved jack pads for supporting a vehicle jack. The components and operation of vehicle jacks are commonly known to those skilled in the art and will not be discussed in detail. In general, the user may be provided with a control panel such as for example, a switch panel, within the vehicle for operating the jack. Suitable power sources may be used, including, without limitation, the vehicle's electrical system, rechargeable and non-rechargeable batteries, self-contained power units, or other appropriate sources. Typical electric and hydraulic jacks are capable of being extended downwardly from the underside of the vehicle towards an underlying support surface to level the vehicle on the camp ground. When the camper wishes to leave, the jack feet are retracted upwardly towards the underside of the vehicle, allowing the vehicle to leave the camp site. The configurations of jacks are typically controlled by industry standards.

As used herein, the term "vehicle" refers to any type of conveyance moving on wheels including, but not limited to, a recreational vehicle such as, for example, a camper, trailer, fifth wheel, toy hauler or motor home.

As used herein, the term "support surface" refers to a surface upon which the vehicle is parked including, but not limited to, even and uneven surfaces such as, for example, asphalt, concrete, rock, sand, gravel, ground, soil, vegetation, grass, and the like.

In one embodiment, the invention comprises an improved jack pad for supporting a jack foot including a foot plate, the pad comprising: a body having an upper surface and a lower surface joined by a side wall, and defining a recess configured for receiving the foot plate and having a retaining lip for securing the foot plate therein.

The invention will now be described having reference to the accompanying figures. FIG. 1 generally shows a typical jack foot 1 configured to fit a corresponding jack to support a vehicle. Each jack can typically support a weight of between about 2,000 lbs to about 10,000 lbs or more, (the pads were tested to 10,000 lbs) with the total vehicle weight typically ranging from but not limited to about 5,000 lbs to about 40,000 lbs. The jack foot 1 generally comprises a leg 4, a foot plate 5, and attachment means 6. The leg 4 comprises a hollow cylindrically-shaped tubing having an inner diameter, an outer diameter, and a length which are dimensioned to receive and accommodate the jack. The leg 4 has an inner diameter which corresponds to the outer diameter of the jack. The jack is removably attached within the leg 4 by suitable attachment means 6 including, for example, set screws, pins, bolts, clips, rivets, or other type of fasteners. The leg 4 may include a mounting bracket 8 defining a plurality of equally spaced holes 9 along its length for mounting to the underside of the vehicle.

Figure 6:
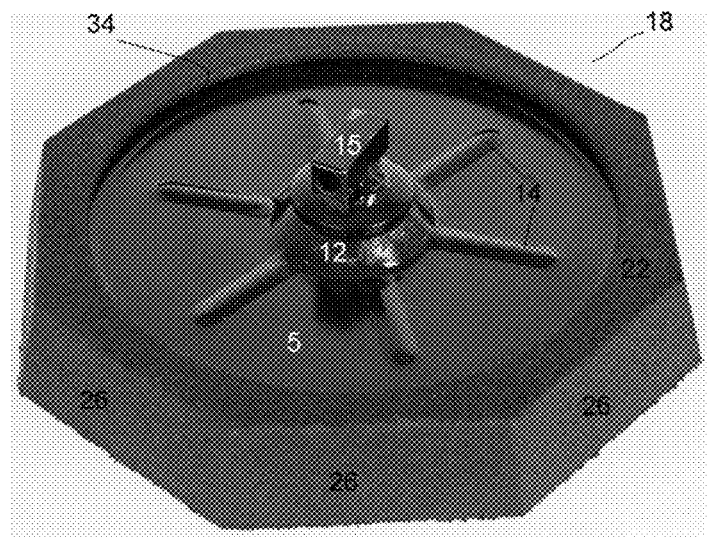
FIG. 6 is a perspective view of one embodiment of the pad in use with the foot plate of FIG. 1.
Figure 7:
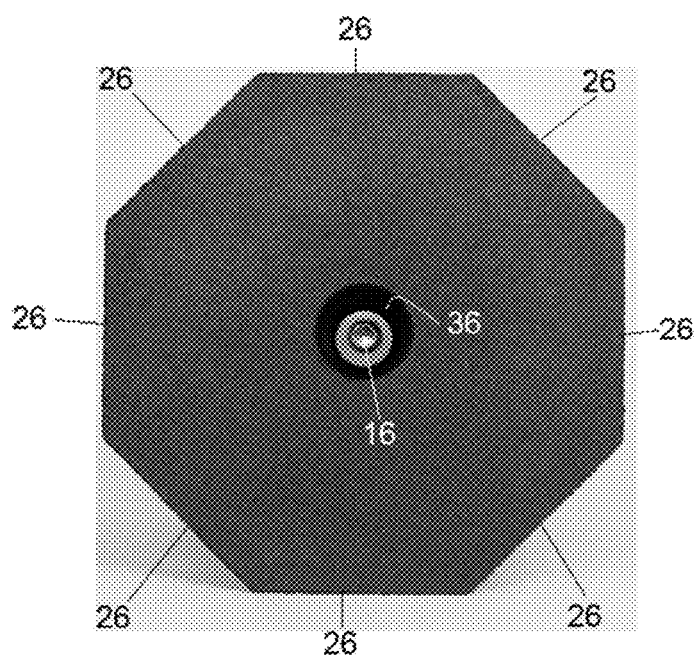
FIG. 7 is a bottom view of the pad shown in FIG. 6.
Figure 8:
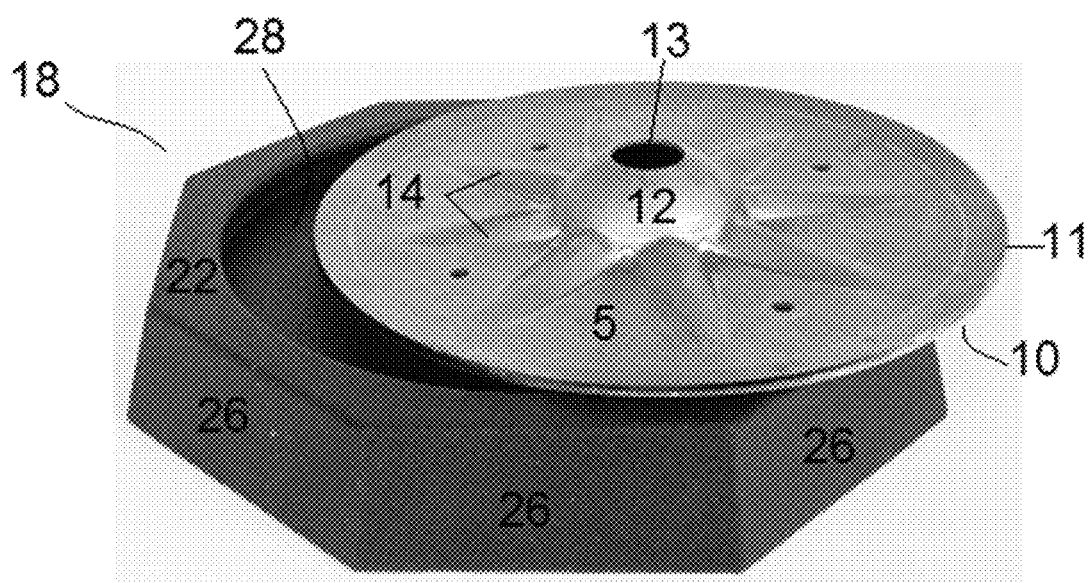
FIG. 8 is a perspective view of one embodiment of the pad in use with a foot plate (uninstalled)
Figure 9:
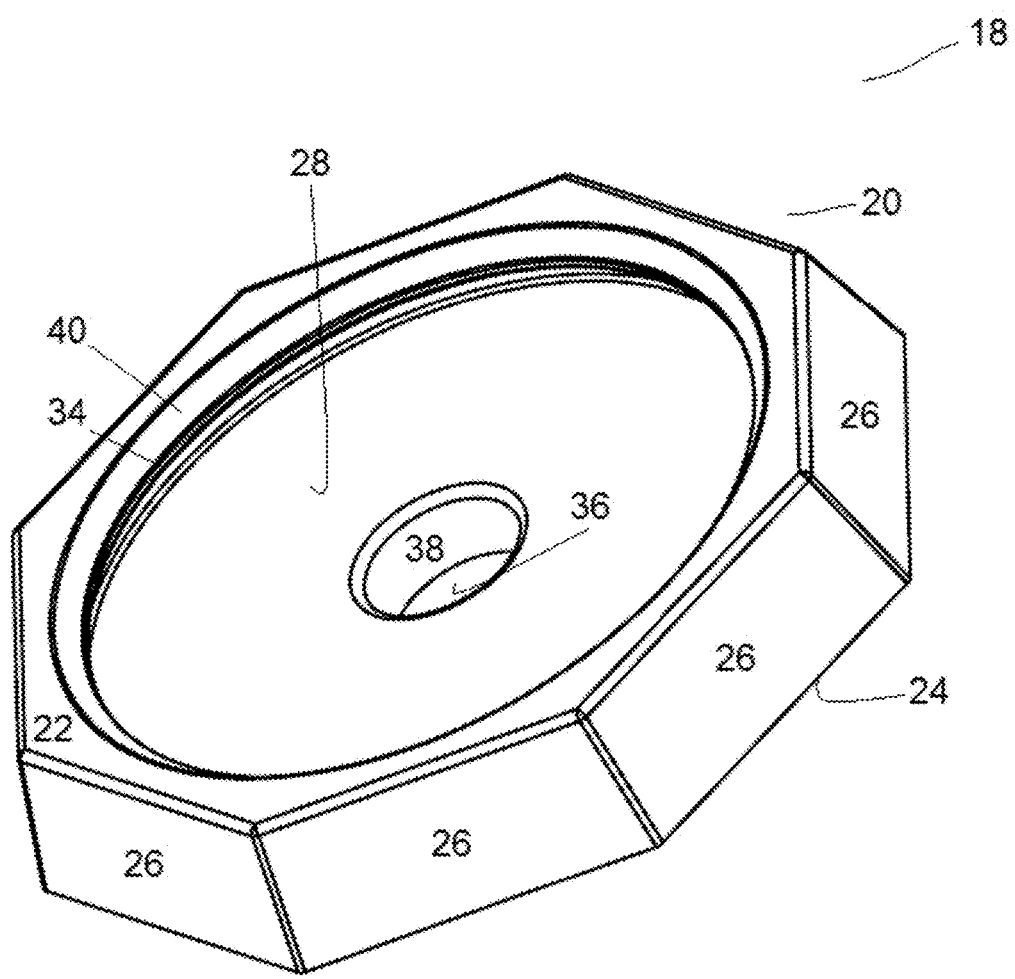
FIG. 9 is a perspective view of one embodiment of the pad.
Figure 10:
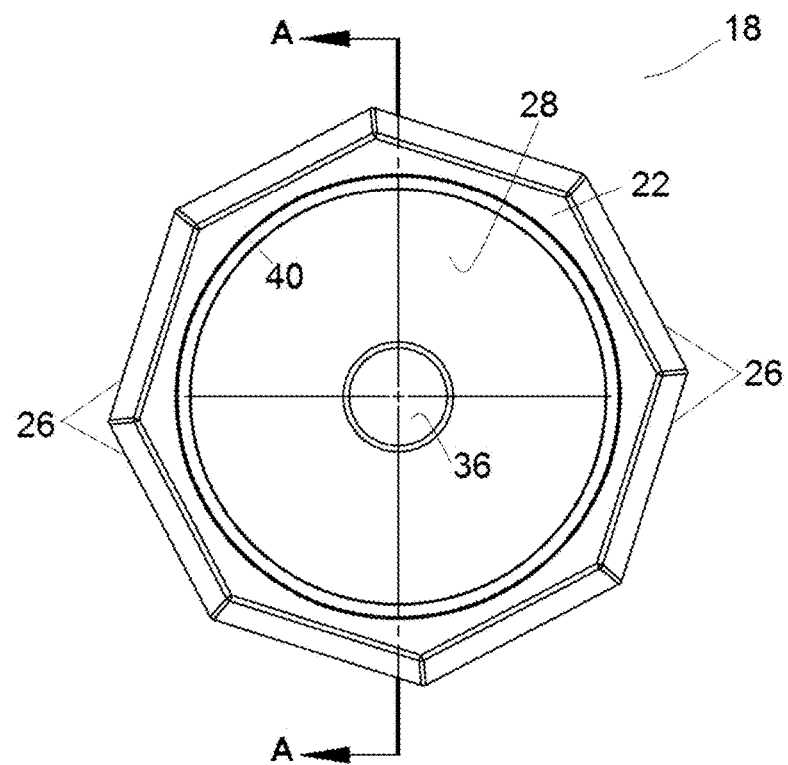
FIG. 10 is a top view of the pad shown in FIG. 9.

The foot plate 5 can comprise a substantially flat base 10 having a peripheral edge 11, a generally centrally positioned dome-shaped portion 12 defining an opening 13 and a plurality of radial arms 14 extending outwardly from the dome-shaped portion 12 towards the peripheral edge 11. The opening 13 receives attachment means 15 therethrough to provide access to remove the foot plate 5 to leg 4. Attachment means 15 may vary depending on the configuration of the foot plate 5. For example, as shown in FIGS. 6-7, the attachment means 15 comprises a rectangular block mounted over the opening 13 by a screw or bolt 16 to attach the leg 4 to the foot plate 5. As depicted in FIG. 8, the foot plate 5 may receive attachment means (not shown) including, but not limited to, screws, bolts, and the like, for attaching the leg 4 to the foot plate 5. The size and shape of the foot plate 5 may vary; for example, the foot plate 5 may be circular as shown in FIGS. 6, and 8, or rectangular as are well known in the art. The foot plate 5 may be formed of heavy duty steel and optionally, may be coated with a protective coating, such as for example a black e-coat finish, to resist corrosion.

FIGS. 2-8 generally show a first embodiment of the pad 18 of the present invention in use with a foot plate 5. The pad 18 is shown generally to comprise a body 20 having an upper surface 22 and a lower surface 24 which are joined by a side wall 26.

The upper surface 22 is substantially flat to provide a relatively planar surface. The lower surface 24 is substantially flat to provide a relatively planar surface for the pad 18 to rest on any underlying support surface.

In one embodiment, the side wall 26 is arranged in a generally octagonal configuration. Compared to a round configuration, an octagonal configuration may have less deflection and greater stiffness to withstand a load, as described in the Example. While an octagonal configuration is depicted, it will be appreciated by those skilled in the art that other shapes such as for example, circular, oval, square, rectangular, hexagonal, heptagonal, nonagonal, decagonal, and the like, are included within the scope of the invention.

The body 20 defines an inner recess 28 for receiving and retaining the foot plate 5. The recess 28 is formed in the general configuration of the foot plate 5 to provide a snug or secure fit. It is contemplated that the size, shape, and positioning of the recess 28 for an embodiment of the pad 18 may vary. Such factors relating to the recess 28 can be dictated by the dimensions of the foot plate 5.

Figure 3:
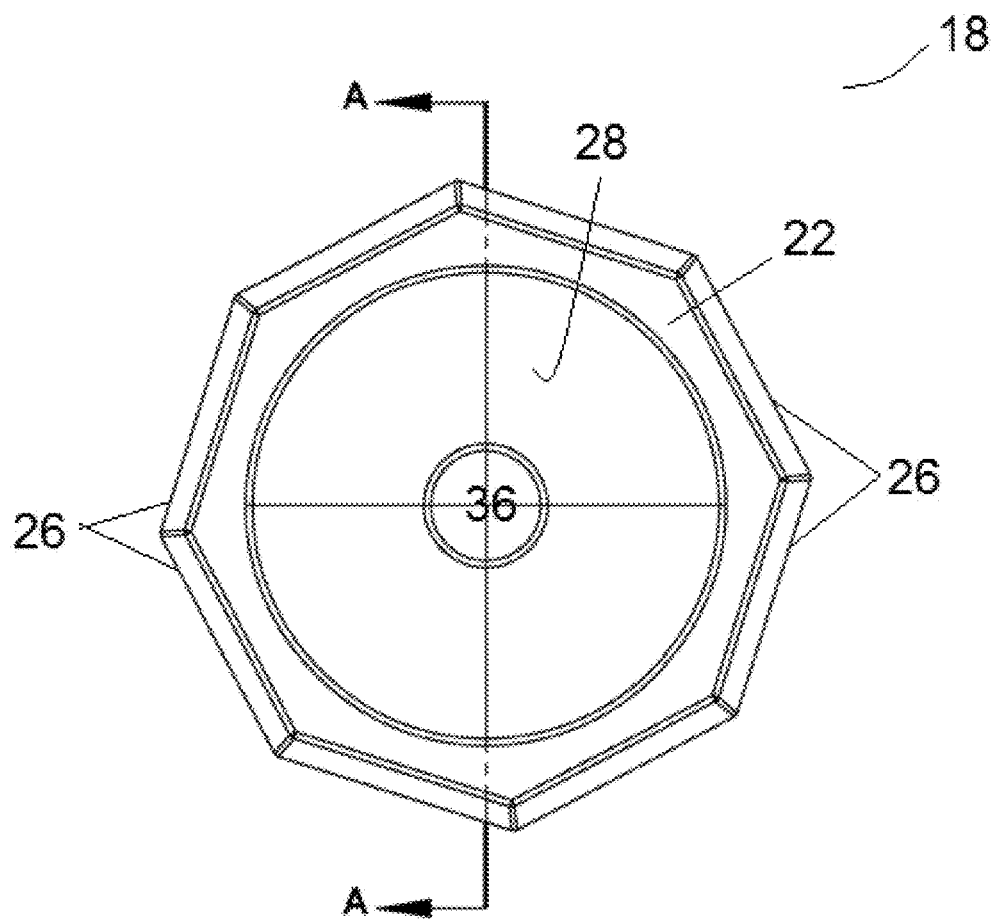
FIG. 3 is a top view of the pad shown in FIG. 2.
Figure 4:
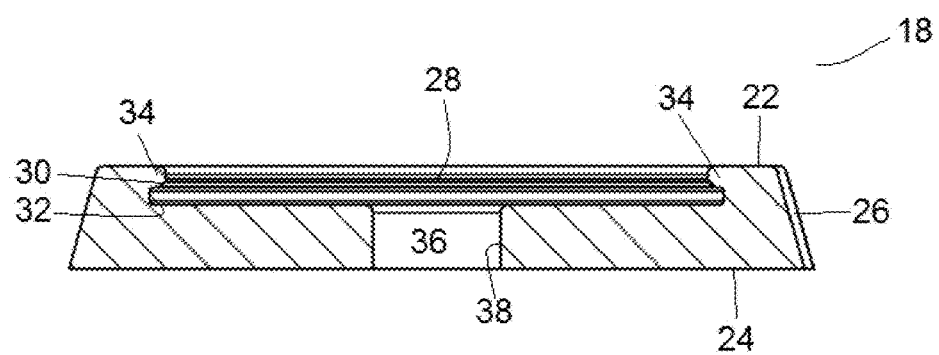
FIG. 4 is a cross-sectional view of the pad taken along line A-A of FIG. 3.
Figure 5:
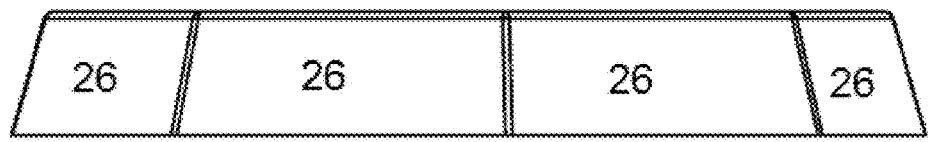
FIG. 5 is a side view of the pad shown in FIG. 2.

Referring now to FIG. 3, the recess 28 is shown as substantially circular-shaped so as to receive and accommodate a similarly shaped foot plate 5. However, it will be appreciated by those skilled in the art that other shapes such as for example, oval, square, rectangular, and the like, are included within the scope of the invention.

In one embodiment, the recess 28 can be positioned substantially in the center of the pad 18. The central positioning of the foot plate 5 within the recess 28 can distribute loading, confer balance and stability, and prevent breakage of the foot plate 5.

In order to retain the foot plate 5 within the recess 28, the edge 30 of the recess 28 may be angular and/or lipped. In one embodiment, a vertically extending circumferential lip 34 grips the peripheral edge 11 of the foot plate 5 upon insertion, which can result in a secure fit. When this fit occurs, the foot plate 5 can be securely held within a groove 32 formed under the lip 34. The lip 34 can serve to retain the foot plate 5 and can prevent relative movement between the foot plate 5 and the pad 18.

Figure 11:
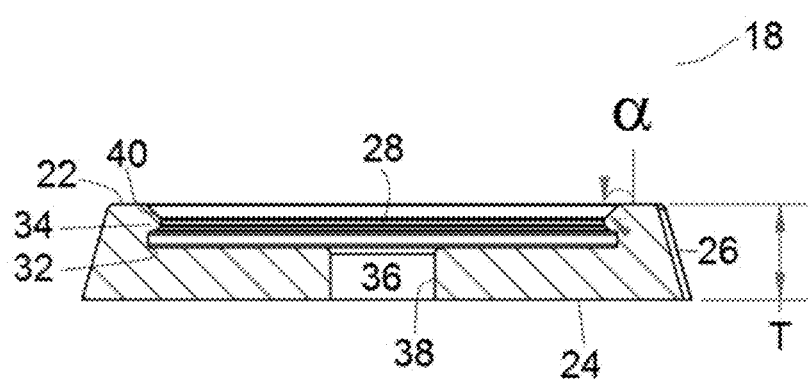
FIG. 11 is a cross-sectional view of the pad taken along line A-A of FIG. 10.
Figure 12:
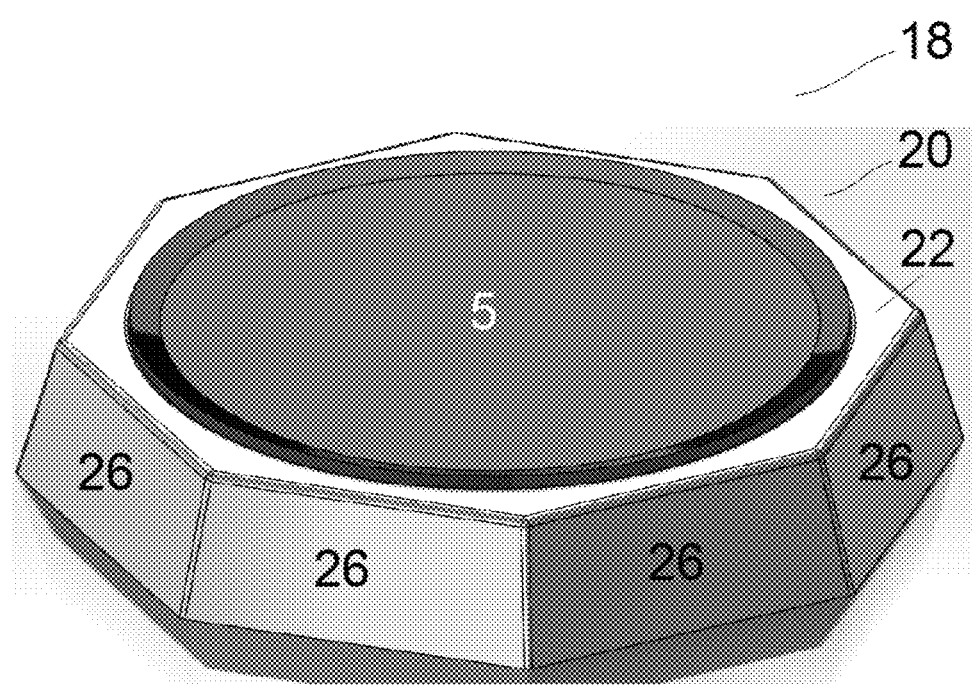
FIG. 12 is a perspective view of the pad of FIG. 9 in use with the foot plate of FIG. 1 (attachment means of foot plate are not shown)

In the embodiment depicted by FIGS. 9-12, the edge 30 of the recess 28 is angular to define a bevelled or chamfered portion 40. The bevelled portion 40 comprises an annular inclined portion which extends circumferentially around the recess 28. In one embodiment, the bevelled portion 40 can be formed by straightly cutting off a corresponding portion of the upper surface 22 so that the thickness of the material decreases gradually towards the center of the pad 18. Care should be taken so as to avoid formation of any undulation on the surface of the bevelled portion 40. In one embodiment, the bevel angle (a) can range from about 30 degrees to about 65 degrees with an imaginary line extending from the upper surface 22 of the pad 18. In one embodiment, the bevel angle (a) is about 45 degrees. The bevelled portion 40 widens the recess 28 to guide the foot plate 5 into the pad 18 to avoid pinching the lip 34. The embodiment of the pad 18 shown in FIGS. 9-12 can have a greater overall thickness (T) or height compared to the thickness or height of the embodiment of the pad 18 shown in FIGS. 2-8. For example, the embodiment of the pad 18 depicted in FIGS. 9-12 can have a thickness of about 1.8 inches, whereas the pad 18 in FIGS. 2-7 can have a thickness of about 1.5 inches. As shown in FIG. 11, the lip 34 is thus smaller and the bevelled portion 40 provides more material above the foot 5 and can retain the foot 5 in place and can prevent relative movement between the foot plate 5 and the pad 18. The foot plate 5 can be securely held within the groove 32 formed under the lip 34.

In one embodiment, the body 20 defines an aperture 36 for receiving and accommodating attachment means 16 of the foot plate 5. The aperture 36 can be formed in the general configuration of the attachment means 16 of the foot plate 5. It is contemplated that the size, shape, and positioning of the aperture 36 for an embodiment of the pad 18 may vary. Such factors relating to the aperture 36 are dictated by the dimensions of the attachment means 16 extending therethrough.

In one embodiment, the aperture 36 can be substantially circular-shaped and can receive and accommodate similarly shaped attachment means 16 of the foot plate 5. The aperture 36 can comprise a hole defined by a continuous edge 38 extending about the hole. While a circular shape is depicted, it will be appreciated by those skilled in the art that other shapes such as for example, oval, square, rectangular, and the like, are included within the scope of the invention. The shape of the aperture 36 may or may not correspond to the exact shape of the recess 28.

In one embodiment, the aperture 36 extends through the body 20 and can allow passage of the attachment means 16 therethrough. In one embodiment, the attachment means 16 may comprise, for example, a screw fastener, bolt, or other fastener which expands into the aperture 36 defined by the body 20, as shown in FIG. 7.

As used herein when describing the recess 28 and aperture 36, the term "longitudinal" refers to the direction in which the recess 28 receives the foot plate 5, and the term "transverse" refers to a direction orthogonal to the longitudinal direction. In one embodiment, the aperture 36 has a transverse dimension which is smaller than the transverse dimension of the recess 28. The transverse dimensions of the recess 28 and aperture 36 can be dictated by the dimensions of the foot plate 5 and attachment means 16. In one embodiment, the aperture 36 aligns substantially with the recess 28. In one embodiment, the aperture 36 may be positioned substantially at the center of the recess 28, but any suitable position including offset from center is considered within the scope of the invention.

In operation, the pad 18 can be securely attached to the foot plate 5 by snap-fit or press-fit. Attachment of the pad 18 and the foot plate 5 can be achieved when the foot plate 5 of the jack foot 1 is placed on top of the pad 18, and pressure or weight is applied. The foot plate 5 can be subsequently pressed into the recess 28 such that its peripheral edge 11 becomes trapped within the groove 32 under the lip 34 as the foot plate 5 and pad 18 are forced together. The lip 34 can maintain the attachment of the pad 18 to the foot plate 5 in a secure manner without the need for external fasteners.

It will be understood by those skilled in the art that if desired, the pad 18 can be permanently attached to the foot plate 5 of the jack foot 1 if the pad 18 is to be used regularly. In one embodiment, one or more adhesives may be used to attach the pad 18 permanently to the foot plate 5. Suitable adhesives may include, but are not limited to, liquid adhesives, glues, two-sided tape, and the like. In one embodiment, at least two layers of adhesives and a barrier layer are used. The first adhesive layer can adhere to rubber 18, while the second adhesive layer 102 can adhere to metal S. The barrier layer 103 is formed of a material such as, for example, plastic, which can adhere to both adhesive layers. In sequence, the pad 18 is coated with the first adhesive layer 104. The barrier layer 103 is placed on top of the first adhesive layer 104 to adhere to the pad 18. The barrier layer 103 is coated with the second adhesive layer 102 which is then covered by a tear-away strip. The tear-away strip can thus be readily removed by manually grasping the strip and tearing or removing the strip to uncover the second adhesive layer 102, thereby allowing the pad 18 to be stuck permanently to the foot plate 5.

Once the foot plate 5 has been installed in the pad 18, the leg 4 can be secured to the foot plate 5 by suitable attachment means 15. The jack can be telescoped or slid into the leg 4 and connected within the leg 4 by suitable attachment means 6 such as, for example, a set screw. The fully assembled jack foot 1 with the pad 18 can then be mounted to the underside of the vehicle using the mounting bracket 8.

The vehicle can be driven to the desired site, such as for example, a designated campground site, and maneuvered into position on the support surface, such as for example, the ground. Using a control panel within the vehicle, the user can extend the jack, jack foot 1 and pad 18 to the ground with the assurance that the pad 18 is properly secured and positioned under the foot plate 5 when the jack is lowered to the ground. Upon further lowering of the jack, jack foot 1 and pad 18, the vehicle can be raised upwardly to a desired height from the ground. Typically, the vehicle has a plurality of jacks which can be adjusted to level and stabilize the vehicle accordingly. Since the pad 18 is flexible, it may conform to uneven ground. When camping is over, the user can retract the jack, jack foot 1 and pad 18 from the ground, thereby allowing the vehicle to depart from the camp site.

It will be appreciated that the pad 18 of the present invention may be simple in design but rugged in construction, such that it can be made at low cost. The upper surface 22, lower surface 24, side wall 26, recess 28, lip 34, and aperture 36 can be integral with the body 20 such that the pad 18 can be formed from a single material.

The pad 18 can be constructed from any material or combination of materials having suitable properties such as, for example, mechanical strength, ability to withstand heat, cold, moisture, and adverse conditions, and ease of manufacture. In one embodiment, the pad 18 may be constructed from a flexible, elastic material having sufficient strength and ruggedness to support the weight and withstand repeated contact with the foot plate 5 and underlying support surface, to increase resistance of the pad 18 to slip, and to conform to uneven underlying support surfaces.

As used herein, the term "flexible" means capable of bending without breaking. As used herein, the term "elastomer" means a material which exhibits the property of elasticity, namely the ability to deform when a stress is applied and to recover its original form (i.e., length, volume, shape, etc.) spontaneously when the stress is removed. Elastomers typically have a low Young's modulus (i.e., the ratio of tensile stress to tensile strain, expressed in units of pressure), and a high yield strain (i.e., the stress at which a material begins to deform plastically, expressed in units of pressure). Suitable elastomeric materials may include, but are not limited to, high friction, low tack materials such as, for example, crumb rubber, natural rubber, plastic materials, and the like. Such materials are durable, lightweight, and relatively inexpensive.

In one embodiment, the pad 18 is formed of crumb rubber. Crumb rubber is recycled rubber from automotive and truck scrap tires; thus, the pad 18 formed from crumb rubber is flexible, durable, strong, and environmentally friendly.

The pad 18 may be fabricated by a molding process including, but not limited to, injection molding and/or compression molding, or other processes known in the art. In one embodiment, the pad 18 may be cast or molded as a single piece. In one embodiment, the pad 18 may be formed of a material which readily enables indicia to be embossed on the side walls 26, or the upper or lower surfaces (22, 24); for example, indicia on the lower surface 24 may include instructions for use of the pad 18.

The dimensions of the pad 18 are not essential to the invention and may be increased or decreased as may be required to satisfy any particular design objectives; for example, the pad 18 may be made available in a variety of dimensions to correspond with different sizes and shapes of foot plates 5. The pad 18 increases the footprint of the foot plate 5 to be greater than the footprint of the foot plate 5 when used alone. Increasing the footprint enhances the stability and reduces sinking of the jack foot 1 into a soft or uneven underlying support surface.

FIG. 6 depicts the pad 18 for use with a first style of foot plate 5, while FIG. 8 depicts the pad 18 for use with a second style of foot plate 5. Since the peripheral edge 11 of the foot plate 5 can be retained by the lip 34, the height or depth of the pad 18 may vary in accordance with the thickness of the foot plate 5 intended for use with the pad 18.

In one embodiment, the dimensions of the pad 18 may be optimized for use with a foot plate 5 having a diameter of about 9 inches. For example, the pad 18 has a height of about 1.5 inches and a width of about 11 inches. In one embodiment, the recess 28 has a diameter which is substantially the same as the diameter of the foot plate 5. In one embodiment, the recess 28 has a diameter of about 9 inches, and a height of about 0.5 inches. The dimensions of the recess 28 are not essential to the invention and may be increased or decreased as may be required to satisfy any particular design objectives; for example, the recess 28 may be made available in a variety of dimensions to correspond with different sizes and shapes of foot plates 5. The lip 34 extends over the peripheral edge 11 of the foot plate 5 by about 0.5 inches when inserted into the pad 18. The aperture 36 has a diameter of about 1.5 inches and a height of about 0.25 inches.

The pad 18 may be easily and readily installed onto the foot plate 5 and can effectively distribute the weight of the jack foot 1 to a larger area, which can thereby prevent sinking and damage to the support surface onto which the jack foot 1 is being placed. Being formed of a flexible, elastomeric material, the pad 18 may conform to uneven surfaces such as, for example, soft ground, sand, gravel, grass, and the like, to ensure stability when the jack foot 1 is extended. The pad 18 can provide support, stability, and protection to the surface of the jack feet from scratches, dents, and rust while the vehicle is being leveled.

Figure 13:
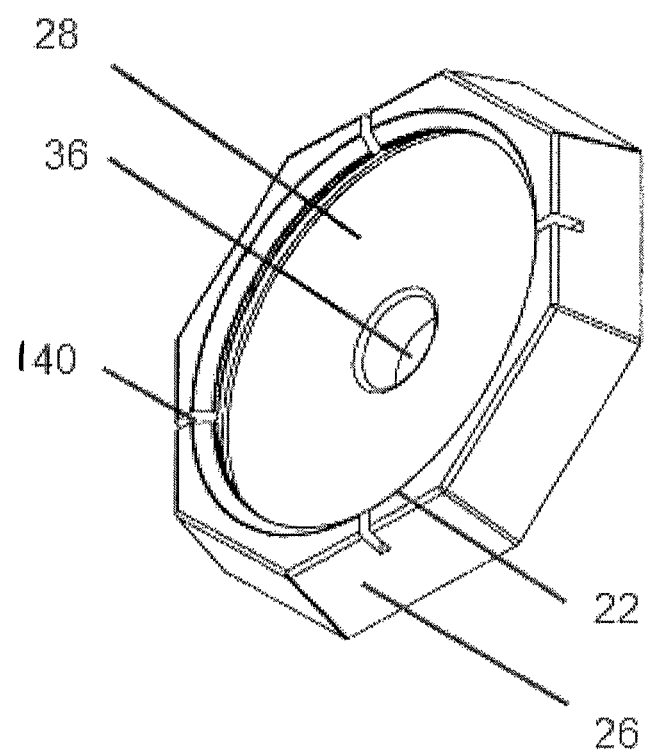
FIG. 13 is a perspective view of one embodiment of the pad further comprising drainage channels.
Figure 14:
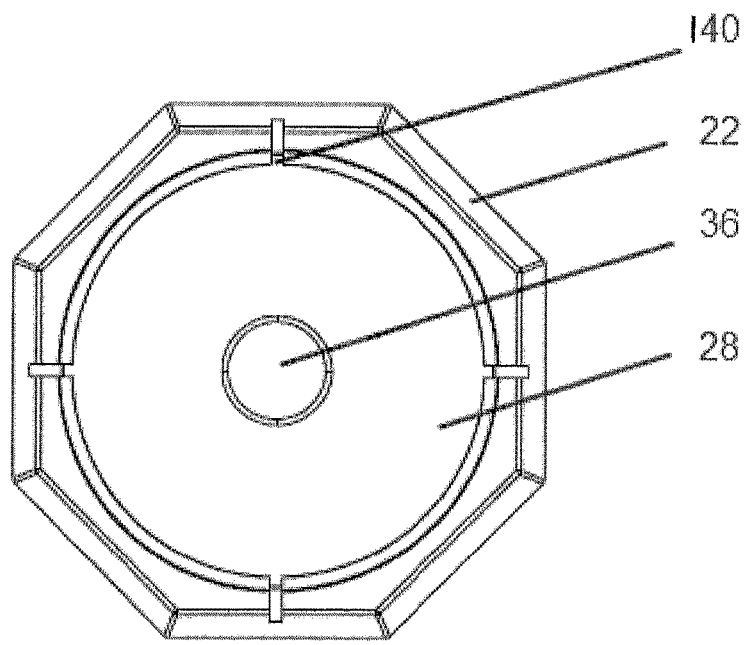
FIG. 14 is a top view of the pad of FIG. 13.
Figure 15:
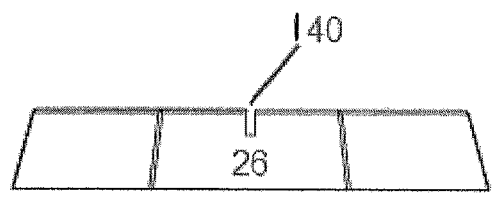
FIG. 15 is a side view of the pad of FIG. 13.

In another embodiment, the pad 18 can be further adapted so as to incorporate means for the drainage of water from the pad 18. During use, water may pool at the top of the jack foot 1 as a result of wet conditions, such as rain. The drainage means can function to assist in the drainage of the pooled water from the pad 18. In the embodiment depicted by FIGS. 13-15, the drainage means can comprise a plurality of channels 140 located at the side wall 26 of the pad 18. While four channels 140 are shown, it will be appreciated that the number and the location of the channels 140 can vary. In one embodiment, for example, the pad 18 may comprise a single channel 140, while in further embodiments, the pad 18 can comprise a plurality of channels 140, such as six or more. As depicted, a channel 140 may positioned so as to be in substantially the same directional plane as an opposing channel 140 located on an opposite side wall 26. However, it will be appreciated that the positioning of the channels may be varied in alternate embodiments.

Figure 16:
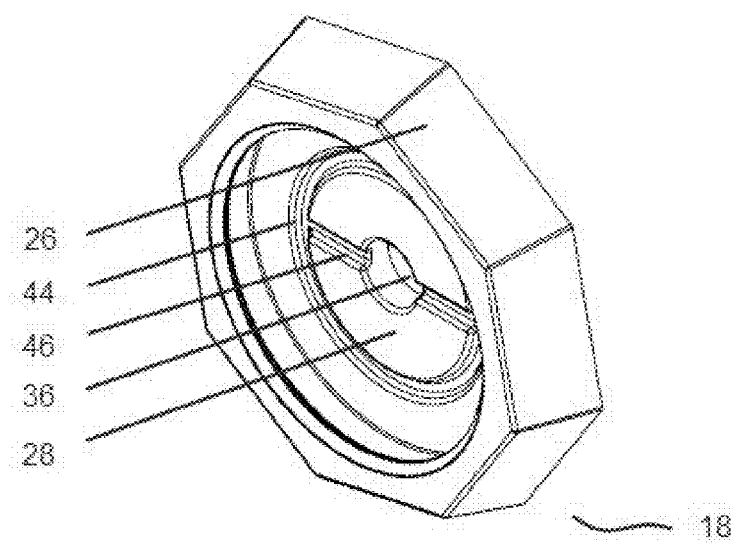
FIG. 16 is a perspective view of one embodiment of the pad comprising alternate drainage means.
Figure 17:
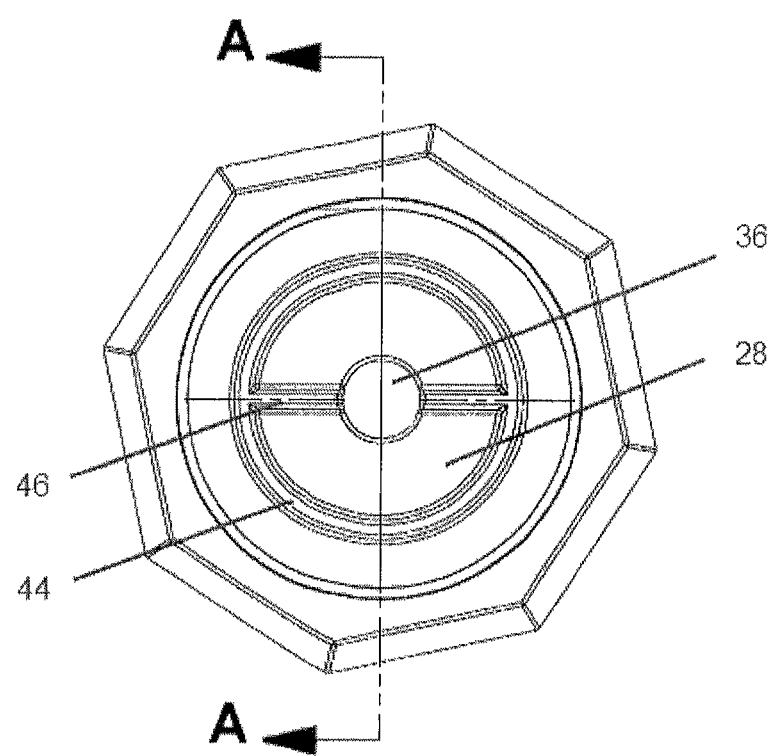
FIG. 17 is a top view of the pad of FIG. 16.
Figure 18A:
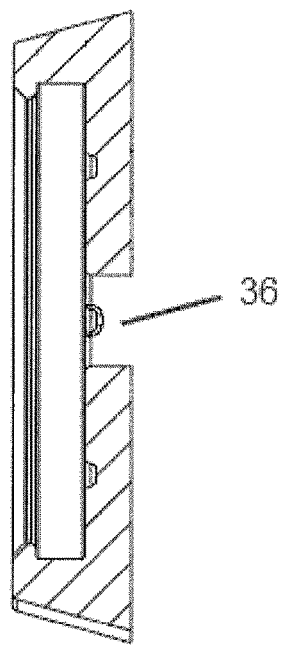
FIG. 18A is a cross-sectional view of the pad taken along line A-A of FIG. 17.
Figure 18B:
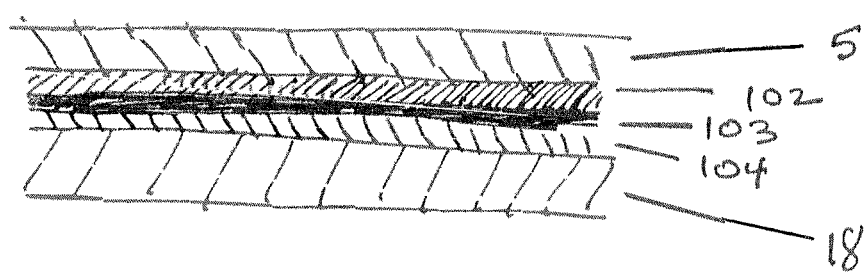
FIG. 18B is a closer view of a cross section showing the layers of foot, adhesive, barrier, adhesive and pad.

Referring again to FIGS. 13-15, a channel 140 can extend a distance from the upper surface 22 of the pad 18 through to the top, or approximately the top of the pad lip 34. It will be appreciated that the degree and the extent of the channel 140 extension may vary. In the embodiment depicted, the dimensions of a channel 140 can comprise a width of approximately 0.25 inches and a height of approximately 0.6 inches. However, it will be appreciated that the dimensions of a channel 140 may vary on the basis of the size and/or design of the pad 18, for example FIGS. 16-18, depict an embodiment of a pad 18 comprising an alternate water drainage means. In the depicted embodiment, the drainage means can comprise channels 44, 46 located on the surface of the pad recess 28, which can function in the direction and release of water through the pad aperture 36. The drainage means can comprise one or more substantially circular shaped channels 44 that interconnects with one or more substantially straight channels 46. The channels 44 and 46 may be recessed, with the depth of the recess comprising any functionally suitable depth.

During operation, a circular channel 44 can direct water to one or more straight channels 46. The water may then be further directed from a straight channel 46 to the aperture 36 with release of the water therethrough. While a circular channel 44 that interconnects with two straight channels 46 is depicted, it can be appreciated that the number and/or positioning of the channels 44, 46 may vary. In one embodiment, for example, a pad 18 may comprise a substantially circular channel 44 interconnecting with a single substantially straight channel 46, while in alternate embodiments, a circular channel 44 may interconnect with three or more straight channels 46.

In yet a further embodiment (not shown), the drainage means can comprise one or more apertures, that can be located at the lower surface 24 of the pad 18.

Exemplary embodiments of the present invention are described in the following Example, which is set forth to aid in the understanding of the invention, and should not be construed to limit in any way the scope of the invention as defined in the claims which follow thereafter.

EXAMPLE

Computer simulations were conducted to compare the deflection of round and octagonal shaped pads. Deflection is the degree to which a structural element is displaced under a load. The test load was 5000 lbs+. The simulations were based on various pressure points on the bottom of the pads. Three simulations for the round pad yielded deflections of 0.125, 0.127, and 0.206. One simulation for the octagonal pad yielded a deflection of 0.088. These results indicate that the octagonal shaped pad deflected less and exhibited greater stiffness compared to the round pad.

It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

REFERENCES

All publications mentioned herein are incorporated herein by reference (where permitted) to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Angel, B. A., Moore, A. D., Russell, J. R., and Tickle, D. P. Stabilizer jack pad. U.S. Pat. No. D531,378, issued Oct. 31, 2006.

Batzel, C. Support pad for a recreational vehicle jack or the like. U.S. Pat. No. Des. 304,575, issued Nov. 14, 1989.

Banks, R. S. Stabilizer pad for vehicles. United States Patent Application No. 2009/0072525, published Mar. 19, 2009.

Brockington, W. T. and Angel, B. A. Stabilizing jack pad. U.S. Pat. No. D668,423, issued Oct. 2, 2012.

Evans, L. W. and Evans, L. W. Weight distribution pad for trailers. U.S. Pat. No. 5,419,524, issued May 30, 1995.

Gebr. Otto K. G. A plate for supporting a vehicle. GB Patent Specification No. 1,387,347, published Mar. 19, 1975.

Jones, D. C. Trailer tongue or wheel chock and support. U.S. Pat. No. 5,046,587, issued Sep. 10, 1991.

Koberg, R. Stabilizer pad and handle apparatus. U.S. Pat. No. 8,814,121, issued Aug. 26, 2014.

Leicester, G. C. and Orrell, J. W. Load-spreading foot. UK Patent Application No. GB 2501698, published Nov. 6, 2013.

Lucas, B. L. Support for a vehicle jack. United States Patent Application No. 2005/0017223, published Jan. 27, 2005.

O'Dell, G. and O'Dell, M. Load distributor. International Publication No. WO 03/064239, published Aug. 7, 2003.

Ringe, S. J. Sand shoe. U.S. Pat. No. 4,634,144, issued Jan. 6, 1987.

Sandberg, R. A. Automobile jack supporting base. U.S. Pat. No. 2,221,203, issued Nov. 12, 1940.

Sauber, C. J. Outrigger pad. U.S. Pat. No. 4,073,454, issued Feb. 14, 1978.

Stonhaus, J. H. Jacking plate for trailer and the like. U.S. Pat. No. 4,254,927, issued Mar. 10, 1981.

What is claimed is:

1. An improved jack pad for supporting a foot plate of a jack foot for attachment to said foot plate and jack foot, the jack pad comprising:
   a body having an upper surface and a lower surface joined by a side wall, and defining a recess configured for receiving the foot plate and having a retaining lip for securing the foot plate therein, the recess being positioned in the center of the pad, the lip including a vertically extending circumferential lip configured for gripping a peripheral edge of the foot plate within a groove formed under the lip upon insertion, further comprising drainage means for allowing drainage of water from the pad, the drainage means comprising one or more channels located at the upper surface, one or more substantially circular channels interconnecting with one or more substantially straight channels located on the upper surface within the recess.

2. The pad of claim 1, wherein the side wall is arranged in an octagonal configuration.

3. The pad of claim 1, wherein the recess is substantially circular-shaped.

4. The pad of claim 1, wherein the recess has a diameter which is substantially the same as the diameter of a foot plate the recess is to receive.

5. The pad of claim 4, further comprising an aperture extending through the body to receive and accommodate attachment means of the foot plate therethrough.

6. The pad of claim 5, wherein the aperture is positioned at the center of the recess.

7. The pad of claim 6, wherein the aperture is substantially circular-shaped.

8. The pad of claim 5, further comprising a beveled portion comprising an annular inclined portion extending circumferentially around the recess.

9. The pad of claim 8, wherein the beveled portion forms an angle ranging from about 30 degrees to about 65 degrees.

10. The pad of claim 9, wherein the beveled portion forms an angle of about 45 degrees.

11. The pad of claim 1, wherein the upper surface and lower surface are substantially flat to provide relatively planar surfaces.

12. The pad of claim 1, further comprising at least one adhesive layer coated onto the pad, the foot plate, or both.

13. The pad of claim 12, further comprising at least one barrier layer between adjacent adhesive layers.

14. The pad of claim 1, being formed of a flexible, elastic material.

15. The pad of claim 14, wherein the material comprises crumb rubber, resin, or a combination thereof.

16. The pad of claim 1, wherein at least one of the one or more channels extends a distance from the upper surface through to about the top of the lip.

17. The pad of claim 16, comprising four channels.

18. The pad of claim 1, wherein the drainage means comprises one or more apertures.

19. A method for using the improved jack pad of claim 1 for providing support to a vehicle on a support surface, comprising:
   placement of a jack foot plate onto the recess of the pad;
   applying pressure to both the jack foot plate and the pad, such that the jack foot plate peripheral edge is securely positioned under the retaining lip of the pad, the retaining lip securing the pad with the jack foot plate.

20. The pad of claim 1, wherein the pad is permanently attached to the foot.

21. An improved jack pad for supporting a foot plate of a jack foot, the pad being formed of a flexible, elastic material and comprising:
   a body having an upper surface and a lower surface;
   a side wall joining the upper surface and the lower surface;
   a recess configured for receiving and attaching to the foot plate, the recess positioned at substantially the center of the upper surface of the pad, wherein the recess has an interior shape which is substantially the same as the shape of the foot plate;
   a deformable retaining lip extending from the upper surface at the outer edge of the recess and extending over the recess to form a groove, the lip deformable to permit insertion of the foot plate into the recess returning to its original shape to engage with and secure the foot plate in the groove of the recess, the lip thereby configured for gripping around essentially all of a peripheral edge of the foot plate within the groove formed under the lip upon insertion; and
   a beveled portion comprising an annular inclined portion extending circumferentially around the lip of the recess.

22. The pad of claim 21, further comprising one or more drainage channels extending from the upper surface through to about the top of the lip for allowing the drainage of water from the pad.

23. The pad of claim 21, further comprising one or more substantially circular channels interconnecting with one or more substantially straight channels located on the surface of the recess for allowing the drainage of water from the pad.

24. The pad of claim 21, wherein the pad is permanently attached to the foot.

25. An improved jack pad for supporting a foot plate of a jack foot for attachment to said foot plate and jack foot, the jack pad comprising:
   a body having an upper surface and a lower surface joined by a side wall, and defining a recess configured for receiving the foot plate and having a retaining lip for securing the foot plate therein, the recess being positioned in the center of the pad, the recess having a diameter which is substantially the same as the diameter of a foot plate the recess is to receive; further comprising an aperture extending through the body to receive and accommodate attachment means of the foot plate therethrough, drainage means for allowing drainage of water from the pad, the drainage means comprising one or more channels located at the upper surface, one or more substantially circular channels interconnecting with one or more substantially straight channels located on the upper surface within the recess.

26. The pad of claim 25, wherein the lip comprises a vertically extending circumferential lip configured for gripping a peripheral edge of the foot plate within a groove formed under the lip upon insertion.

27. The pad of claim 25, wherein the side wall is arranged in an octagonal configuration.

28. The pad of claim 25, wherein the recess is substantially circular-shaped.

29. The pad of claim 25, wherein the aperture is positioned at the center of the recess.

30. The pad of claim 29, wherein the aperture is substantially circular-shaped.

31. The pad of claim 25, further comprising a beveled portion comprising an annular inclined portion extending circumferentially around the recess.

32. The pad of claim 31, wherein the beveled portion forms an angle ranging from about 30 degrees to about 65 degrees.

33. The pad of claim 32, wherein the beveled portion forms an angle of about 45 degrees.

34. The pad of claim 25, wherein the upper surface and lower surface are substantially flat to provide relatively planar surfaces.

35. The pad of claim 25, further comprising at least one adhesive layer coated onto the pad, the foot plate, or both.

36. The pad of claim 35, further comprising at least one barrier layer between adjacent adhesive layers.

37. The pad of claim 25, being formed of a flexible, elastic material.

38. The pad of claim 37, wherein the material comprises crumb rubber, resin, or a combination thereof.

39. The pad of claim 25, wherein at least one of the one or more channels extends a distance from the upper surface through to about the top of the lip.

40. The pad of claim 39, comprising four channels.

41. The pad of claim 25, wherein the drainage means comprises one or more apertures.

42. The pad of claim 25, wherein the pad is permanently attached to the foot.

* * * * *